(12) United States Patent
Friend et al.

(10) Patent No.: US 9,098,087 B2
(45) Date of Patent: Aug. 4, 2015

(54) SYSTEM AND METHOD FOR ADJUSTING THE OPERATION OF A MACHINE (71) Applicant: Caterpillar Inc., Peoria, IL (US)

(72) Inventors: Paul Friend, Morton, IL (US);
Jean-Jacques Clar, Edelstein, IL (US);
Brian G. Funke, Peoria, IL (US); Troy K. Becicka, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/758,230

(22) Filed: Feb. 4, 2013

(65) Prior Publication Data

US 2014/0222247 A1    Aug. 7, 2014

(51) Int. Cl.
*G05D 1/00* (2006.01)
*G05D 1/02* (2006.01)

(52) U.S. Cl.
CPC ...... *G05D 1/0276* (2013.01); *G05D 2201/0202* (2013.01)

(58) Field of Classification Search
CPC ............. E02F 9/205; E02F 9/2054; G05D 2201/0202; G05D 1/0276; B60R 25/00; G07C 5/008; F02N 11/0807
USPC ............ 701/2, 26, 48, 112, 446, 50; 356/4.01
See application file for complete search history.

(56) References Cited

U.S. PATENT DOCUMENTS

| | | | |
|---|---|---|---|
| 5,469,356 A * | 11/1995 | Hawkins et al. | 701/48 |
| 5,987,379 A * | 11/1999 | Smith | 701/468 |
| 6,246,932 B1 | 6/2001 | Kageyama et al. | |
| 6,493,612 B1 | 12/2002 | Bisset et al. | |
| 6,633,800 B1 * | 10/2003 | Ward et al. | 701/2 |
| 6,984,952 B2 | 1/2006 | Peless et al. | |
| 7,522,066 B2 * | 4/2009 | Galera et al. | 340/686.6 |
| 7,734,397 B2 | 6/2010 | Peterson et al. | |
| 7,881,497 B2 | 2/2011 | Ganguli et al. | |
| 8,301,318 B2 * | 10/2012 | Lacaze et al. | 701/2 |
| 2002/0195275 A1 * | 12/2002 | Brand et al. | 175/24 |
| 2006/0136101 A1 * | 6/2006 | Spengler | 701/2 |
| 2006/0271263 A1 * | 11/2006 | Self et al. | 701/50 |
| 2008/0234878 A1 * | 9/2008 | Joao | 701/2 |
| 2010/0250023 A1 * | 9/2010 | Gudat | 701/2 |
| 2011/0015816 A1 * | 1/2011 | Dow et al. | 701/23 |
| 2012/0136508 A1 * | 5/2012 | Taylor et al. | 701/2 |
| 2012/0283905 A1 * | 11/2012 | Nakano et al. | 701/25 |

FOREIGN PATENT DOCUMENTS

JP    2000-137522 A    5/2000

* cited by examiner

*Primary Examiner* — Helal A Algahaim
*Assistant Examiner* — Shardul Patel
(74) *Attorney, Agent, or Firm* — Leydig, Voit & Mayer, Ltd.

(57) ABSTRACT

A system for controlling movement of a machine includes a drive system, a position sensor, and a communications system. A controller is configured to determine the position of the machine and determine a signal transmission threshold based at least in part upon the position of the machine. The controller may stop movement of the machine upon an interruption in signal transmission from a remote system exceeding the signal transmission threshold.

20 Claims, 5 Drawing Sheets

SYSTEM AND METHOD FOR ADJUSTING THE OPERATION OF A MACHINE

TECHNICAL FIELD

This disclosure relates generally to controlling movement of a machine and, more particularly, to a system and method for adjusting the operation of a machined based upon interruptions in signal transmission.

BACKGROUND

Machines such as dozers, load trucks, motor graders, wheel loaders, etc., are used to perform a variety of tasks, and they may move about a work site as they move material and perform other operations at the work site. The machines may operate in an autonomous or semi-autonomous manner to perform these tasks in response to commands generated as part of a work plan for the machines. Autonomously and semi-autonomously operated machines may increase productivity and permit operation in environments that are unsuitable or undesirable for a human operator. Autonomous or semi-autonomous systems may also compensate for inexperienced human operators as well as inefficiencies associated with repetitive tasks.

As a machine performs its tasks, it may receive information and instructions from systems that are located remotely from the machine. When an interruption in a signal or communications channel or other factors prevents communication between the machine and a remote monitoring system, the machine may be configured to cease operation until communications are restored and an operator provides an appropriate start-up signal to the machine. If an interruption in a communications channel occurs with a positioning system, the machine may continue to operate by dead reckoning but only for a relatively short period of time. The operating efficiency of the machine may be closely related to the number of interruptions experienced during operation of the machine.

U.S. Pat. No. 7,522,066 discloses a system for evaluating proximity to potential hazards. The system may include a plurality of sensors that are used to determine the distance from potential hazards. If the system determines that a person is located closer to a hazard than desired, the system may stop the operation of a machine. A zone around each hazard may set a minimum distance from the hazard.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for controlling movement of a machine includes a drive system for causing movement of the machine, a position sensor associated with the machine for generating position signals indicative of a position of the machine, a communications system for transmitting signals between the machine and a remote system spaced from the machine, and a controller. The controller is configured to determine the position of the machine based upon the position signals, to receive the signals from the remote system, to determine a signal transmission threshold based at least in part upon the position of the machine, and to generate a command signal to stop movement of the machine upon an interruption in signal transmission from the remote system exceeding the signal transmission threshold.

In another aspect, a controller-implemented method for controlling movement of a machine includes determining the position of the machine based upon position signals from a position sensor associated with the machine, moving the machine, and receiving signals from a remote system spaced from the machine. The method further includes determining a signal transmission threshold based at least in part upon the position of the machine, and generating a command signal to stop movement of the machine upon an interruption in signal transmission from the remote system exceeding the signal transmission threshold.

In still another aspect, a system for controlling movement of a machine within a work site includes a drive system for causing movement of the machine, a position sensor associated with the machine for generating position signals indicative of a position of the machine, a communications system for transmitting signals between the machine and a remote system spaced from the machine, and a controller. The controller is configured to store an electronic map of the work site which includes a plurality of obstacles and each obstacle has an avoidance zone associated therewith. The controller is further configured to determine the position of the machine based upon the position signals, to receive the signals from the remote system, and to determine a zone of interference associated with the machine. The controller is also configured to increase a size of one of the zone of interference and the avoidance zone upon an interruption in signal transmission from the remote system and to generate a command signal to stop movement of the machine if the zone of interference intersects with the avoidance zone.

DETAILED DESCRIPTION

Figure 1:
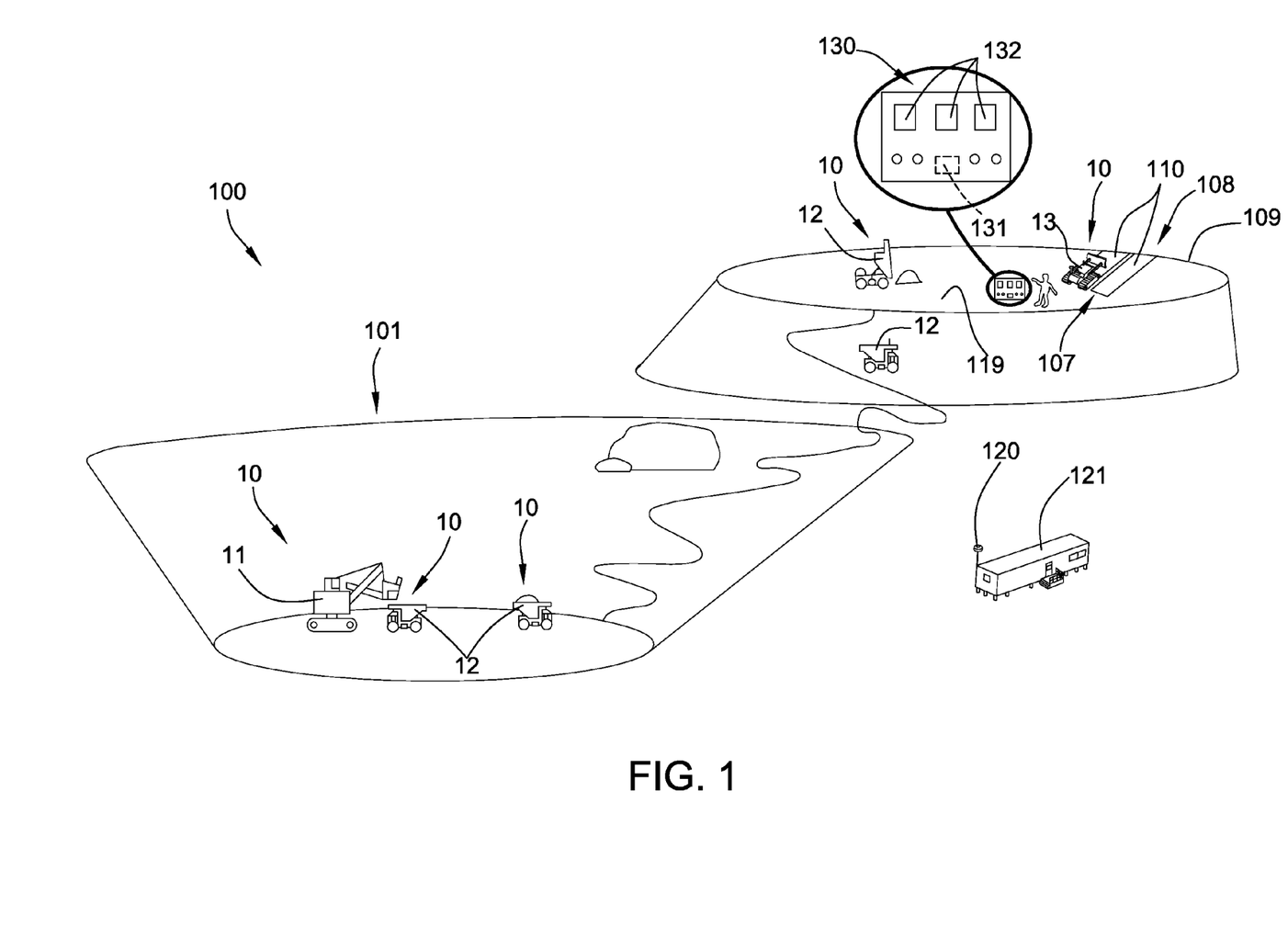
FIG. 1 shows a schematic view of a work site at which a machine incorporating the principles disclosed herein may be used.

FIG. 1 depicts a diagrammatic illustration of a work site 100 at which one or more machines 10 may operate in an autonomous, a semi-autonomous, or manual manner. Work site 100 may be a portion of a mining site, a landfill, a quarry, a construction site, a roadwork site, a forest, a farm, or any other area in which movement of machines is desired. As depicted, work site 100 includes an open-cast or open pit mine 101 from which material 104 may be excavated or removed by a machine such as an excavator 11 and loaded into a machine such as a load truck 12. The load trucks 12 may travel along a road 102 to dump location 108 at which the material 104 is dumped. A machine such as a dozer 13 may move material 104 long the work surface 105 towards a crest 106 such as an edge of a ridge, embankment, high wall or other change in elevation. Work surface 105 may take any form and refers to the actual profile or position of the terrain of the work site 100.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine 10 operating semi-autonomously includes an operator, either within the machine or remotely, who performs some tasks or provides some input and other tasks are performed automatically and may be based upon information received from various sensors. As an example, a load truck 12 that automatically follows a path from one location to another but relies upon an operator command to dump a load may be operating semi-autonomously. In another example of a semi-autonomous operation, an operator may dump a bucket from an excavator 11 in a load truck 12 and a controller may automatically return the bucket to a position to perform another digging operation. A machine 10 being operated manually is one in which an operator is controlling all or essentially all of the functions of the machine. A machine 10 may be operated remotely by an operator (i.e., remote control) in either a manual or semi-autonomous manner.

Figure 2:
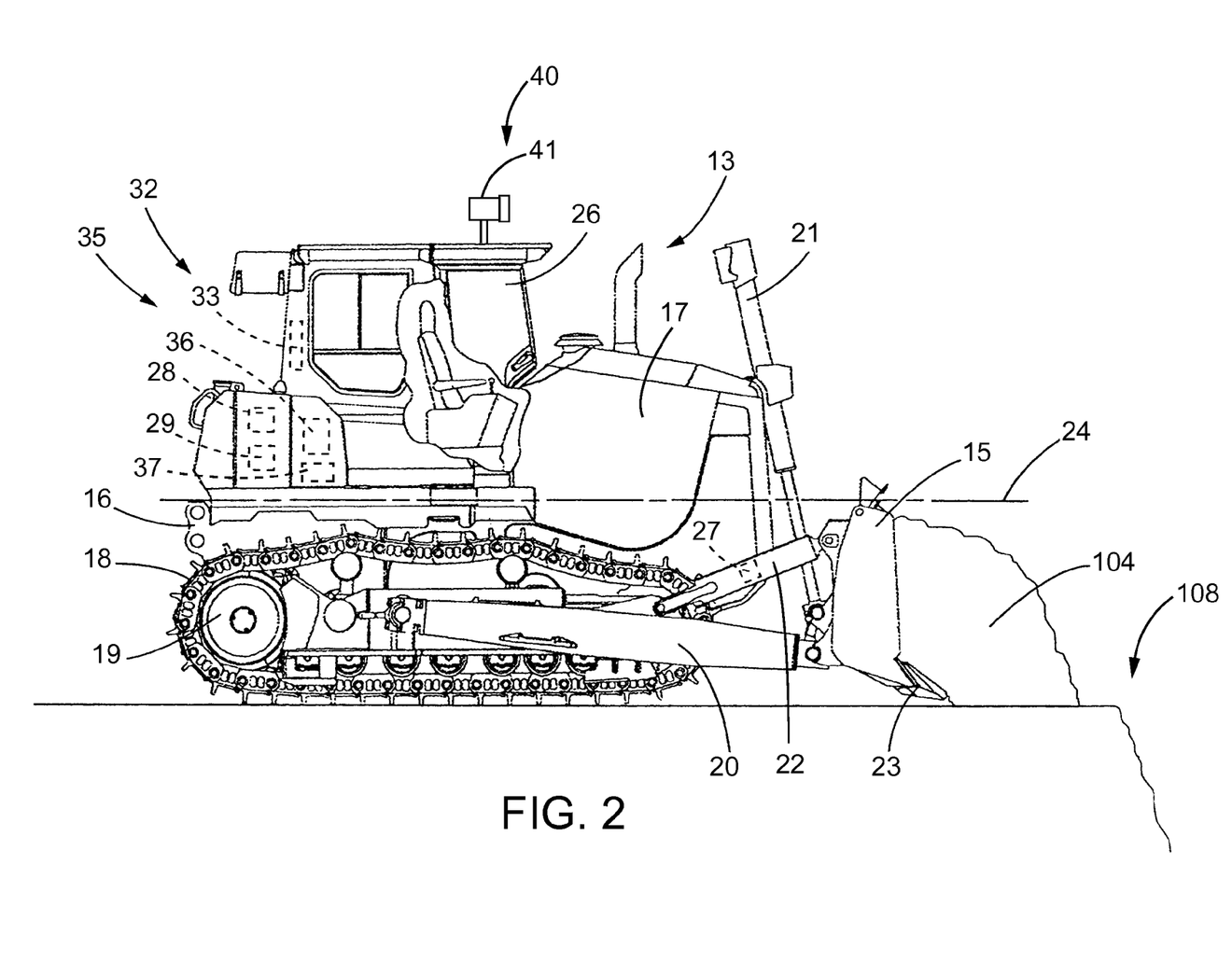
FIG. 2 shows a diagrammatic illustration of a machine in accordance with the disclosure.

FIG. 2 shows a diagrammatic illustration of a machine 10 such as a dozer 13 adjacent crest 106 with a work implement or a blade 15 pushing material 104 over the crest. The machine 10 includes a frame 16 and a prime mover such as an engine 17. A ground-engaging drive mechanism such as a track 18 is driven by a drive wheel 19 on each side of machine 10 to propel the machine. Although machine 10 is shown in a "track-type" configuration, other configurations, such as a wheeled configuration, may be used. Operation of the engine 17 and a transmission (not shown) which are operatively connected to the tracks 18 and drive wheels 19 may be controlled by a control system 35 including a controller 36. Other types of prime movers and drive systems for causing movement of the machine 10 are contemplated.

Machine 10 may include a ground engaging work implement such as blade 15 pivotally connected to frame 16 by arms 20 on each side of machine 10. First hydraulic cylinder 21 coupled to frame 16 supports blade 15 in the vertical direction, and allows blade 15 to move up or down vertically from the point of view of FIG. 2. Second hydraulic cylinders 22 on each side of machine 10 allow the pitch angle of blade tip 23 to change relative to a centerline 24 of the machine.

Machine 10 may include a cab 26 that an operator may physically occupy and provide input to control the machine. Cab 26 may include one or more input devices through which the operator issues commands to control the propulsion and steering of the machine as well as operate various implements associated with the machine.

Machine 10 may be equipped with a plurality of sensors that provide data indicative (directly or indirectly) of various operating parameters of the machine. The term "sensor" is meant to be used in its broadest sense to include one or more sensors and related components that may be associated with the machine 10 and that may cooperate to sense various functions, operations, and operating characteristics of the machine.

One or more movement sensors may be positioned on the machine 10 for sensing movement of the machine 10 and generating movement signals indicative of movement of the machine. A pitch rate sensor 28 (e.g., a gyroscope) may be provided or mounted on the machine 10, on the blade 15, or on an implement frame member to which the blade is mounted. The pitch rate sensor 28 may be used to provide a pitch rate signal indicative of a measured pitch rate of the machine 10 or the blade 15 depending on where the sensor is mounted. The pitch rate sensor 28 may be a "stand-alone" sensor or part of a multi-function sensor such as an inertial measurement unit that also measures the acceleration of the machine 10 along various axes. The pitch rate measured by the pitch rate sensor 28 is indicative of the rate of change of the pitch angle of the sensor.

An acceleration sensor 29 (e.g., a 3-axis accelerometer) may also be provided as a separate component or part of a multi-function sensor. The acceleration sensor 29 may be used to provide an acceleration signal indicative of acceleration of the machine 10 relative to a gravity reference. If the acceleration sensor 29 is not part of a multi-function sensor, it may be positioned adjacent the pitch rate sensor 28 or at another location on machine 10.

One or more implement position sensors indicated generally at 27 may be provided for determining the position of the blade 15 relative to the machine 10. In one embodiment, the implement position sensors 27 may be rotary potentiometers associated with the pivot joints between the machine 10, the arms 20 and the blade 15. In another example, sensors may be associated with the hydraulic cylinders to determine the displacement of each cylinder. The displacement of the cylinders may be used to determine the position of the blade 15. Other types of sensors are also contemplated.

A position sensing system 32, as shown generally by an arrow in FIG. 2 indicating association with the machine 10, may include a position sensor 33 to sense a position of the machine relative to the work site 100. The position sensor 33 may include a plurality of individual sensors that cooperate to provide signals to controller 36 to indicate the position of the machine 10. In one example, the position sensor 33 may include one or more sensors that interact with a positioning system such as a global positioning system "GPS" to operate as a GPS sensor. The controller 36 may determine the position of the machine 10 within work site 100 as well as the orientation of the machine such as its heading, pitch and roll. In other examples, the position sensor 33 may be an odometer or another wheel rotation sensing sensor, a perception based system, or may use other systems such as lasers, sonar, or radar to determine the position of machine 10.

In some instances, the position sensing system 32 may also operate in conjunction with the movement measuring sensors (e.g., pitch rate sensor 28 and/or acceleration sensor 29) of the machine 10 to increase the accuracy of the position sensing system. For example, the movement measuring sensors may generate signals more frequently than the position sensor 33 (e.g., every 10 milliseconds versus every 100 milliseconds). In other instances, the movement measuring sensors may have less noise associated with their signals. Still further, in instances in which the signal transmission or transmission link from the position sensor 33 is interrupted, the controller 36 may approximate the position of the machine 10 such as by dead reckoning based upon the last known signals provided by the position sensor 33 and the signals provided by the movement measuring sensors.

Machine 10 may be controlled by a control system 35 as shown generally by an arrow in FIG. 2 indicating association with the machine 10. The control system 35 may include an electronic control module or controller 36. The controller 36 may receive input command signals from a wireless network system 120 (FIG. 1), remote control input command signals from an operator using a remote control unit or remote control console 130 to operate machine 10 remotely, or operator input command signals from an operator operating the machine 10 from within cab 26. The controller 36 may control the operation of various aspects of the machine 10 including the drivetrain as well as the hydraulic systems and other systems that operate the blade 15. The control system 35 may utilize various input devices to control the machine 10 and one or more sensors to provide data and input signals representative of various operating parameters of the machine 10 and the environment of the work site 100.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 may be located on the machine 10 and may also include components located remotely from the machine such as at a command center 121 (FIG. 1) or at the remote control console 130. The functionality of control system 35 may be distributed so that certain functions are performed at machine 10 and other functions are performed remotely. In such case, the control system 35 may include a communications system such as wireless network system 120 for transmitting signals between the machine 10 and a system located remote from the machine. For example, remote aspects of control system 35 may provide generalized commands or information over wireless network system 120 to the machine 10 that the portions of control system 35 on the machine utilize to generate specific commands to operate the various systems of machine 10. In another embodiment, remote control console 130 positioned remote from the machine 10 may provide some or all of the specific commands that are then transmitted by the wireless network system 120 to systems of the machine.

Machine 10 may be configured to be operated autonomously, semi-autonomously, or manually. In case of semi-autonomous or manual operation, the machine may be operated by remote control and/or by an operator physically located within the cab 26. If the machine 10 is configured to operate via a remote control system, a visual image system 40 such as a camera system may be provided on the machine 10 for generating visual images indicative of a point of view relative to the machine 10. The visual image system 40 may include a plurality of visual image sensors such as cameras 41 for generating visual image signals. The visual image signals may be transmitted wirelessly to a system remote from machine 10. In doing so, the visual image signals may be processed to some extent by controller 36 at machine 10 and subsequently transmitted to a remote system or transmitted to the remote system and processed by the remote system. The plurality of cameras 41 of the visual image system 40 may be positioned to capture different views that an operator would have from within the cab 26 of machine 10. In an alternate embodiment, a plurality of cameras 41 may be positioned to provide a point of view including the machine 10 and/or the blade 15 as well as a portion of the work site 100 at which the machine is operating.

Still further, if the machine is being operated via remote control, a portion of the control system 35 may be located at the remote control unit or remote control console 130. Machine 10 may include a machine controller 37 and remote control console 130 may include a console controller 131. The machine controller 37 and the console controller 131 may be components of controller 36. In one example, the remote control console 130 may be configured with an instrument array similar to that of the machine 10 with a plurality of gauges, displays, and input devices such as buttons, knobs, dials, levers, joysticks, and other controls. The remote control console 130 may receive directly or indirectly signals from the various sensors on the machine 10. Machine 10 and remote control console 130 may each include communication devices such as wireless transceivers (not shown) to permit wireless signal transmission between the machine and the remote control console. Still further, the wireless transceivers may permit communication with other systems remote from both the machine 10 and the remote control console 130.

The remote control console 130 may also include a point of view display 132 that includes one or more displays upon which visual images from the visual image system 40 may be displayed to depict a point of view relative to machine 10. The point of view display 132 may be used to display images depicting the front, the left side, and the right side of machine 10. If desired, additional images of other points of view may be displayed such as behind the machine 10 or views of other aspects of the machine such as the blade 15.

Controller 36 may be configured to reduce or stop the movement of the machine 10 if signal transmission or the link between the machine 10 and one or more of the remote systems is interrupted for a predetermined period of time. As used herein, an interruption in signal transmission is meant to be used in its broadest sense so as to include an interruption or break in a signal or communications channel or link between a remote system and the machine 10 or between two remote systems such as the remote control console 130 and another remote system. In another example, an interruption in signal transmission may further include a failure of controller 36 to process signals or data that have been received. Still further, an interruption in signal transmission may include any interruption in communication between any components of the control system 35 that may delay a response between any of the machine 10, the remote control console 130, and any other systems associated with the machine, or the transfer of information to or from an operator of the machine. Other types of interruptions are also contemplated.

In one example, an interruption in signal transmission may occur when position sensor 33 on machine 10 does not receive signals from a remote positioning system such as a global positioning system. If the machine 10 is being operated autonomously, the controller 36 may not know the precise position of the machine. If the machine 10 is being operated semi-autonomously, the operator may not know the precise position of the machine. In another example of an interruption in signal transmission, communications between the machine 10 and the remote control console 130 may be interrupted. In one instance, signals from sensors on the machine 10 such as the cameras 41 may be interrupted while being sent from the machine to the remote control console 130. In such case, an operator operating the machine 10 may not be able to see a desired point of view relative to the machine. In still another example of an interruption in signal transmission, signals sent from the remote control console 130 to the machine 10 may be interrupted. In such case, the operator's ability to control the machine 10 may be compromised or reduced. In another example, a remote system may maintain a map of the work site 100 including various obstacles or keep-out areas at the work site. If the link between the remote system maintaining the map of the work site 100 is interrupted, the machine 10 and/or operator may be operating at the work site 100 without the most up-to-date map.

Referring to FIG. 1, machine 10 such as dozer 13 may be configured to move material at the work site 100 according to one or more material movement plans from an initial location 107 to a spread or dump location 108. The dump location 108 may be at crest 106 or at any other location. The material movement plans may include, among other things, forming a plurality of spaced apart channels or slots 110 that are cut into the work surface 105 at work site 100 along a path from the initial location 107 to the dump location 108. In doing so, machine 10 may move back and forth along a generally linear path between the initial location 107 and the dump location 108. If desired, a relatively small amount of material may be left or built up as walls between adjacent slots 110 to prevent or reduce spillage and increase the efficiency of the material moving process. The walls between the slots 110 may be moved after the slots are formed or periodically as desired. The process of moving material through slots 110 while utilizing walls of material to increase the efficiency of the process is sometime referred to as "slot dozing."

Figure 3:
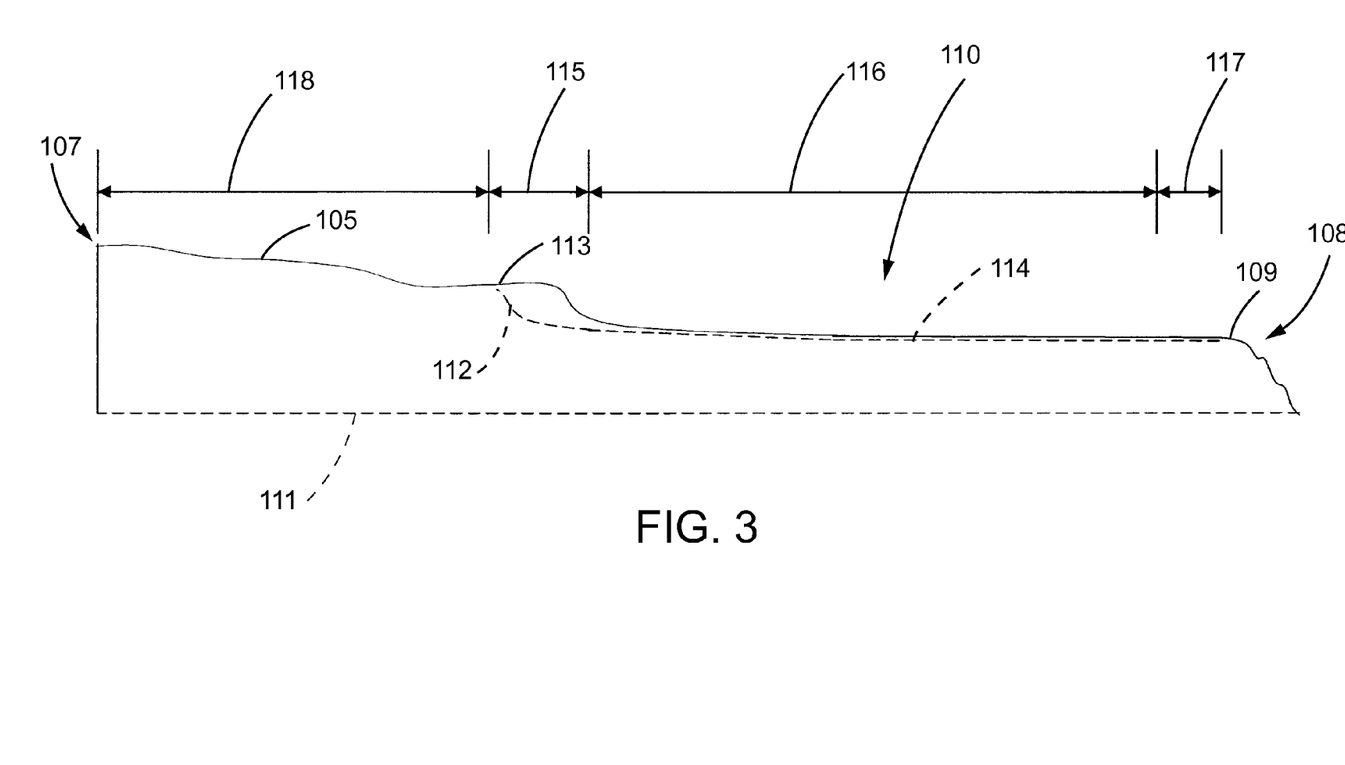
FIG. 3 shows a cross-section of a portion of a work site depicting a material moving plan.

As depicted in FIG. 3, in one embodiment, each slot 110 may be formed by initially setting the desired parameters of the final work surface or final design plane 111. Material may be removed from the work surface 105 in one or more layers or passes until the final design plane 111 is reached. The blade 15 of machine 10 may engage the work surface 105 with a series of cuts such at the cut depicted at 112 that are spaced apart lengthwise along the slot 110. Each cut 112 begins at a cut location 113 along the work surface 105 at which the blade 15 initially engages the work surface and extends into the material 104 towards the pass target or carry surface as depicted by dashed line 114 for a particular pass. Controller 36 may be configured to guide the blade 15 along each cut 112 until reaching the carry surface 114 and then follow the carry surface towards the dump location 108.

As such, each material moving pass may be generally divided into a plurality of different sections as best seen in FIG. 3. As the machine 10 moves along cut section 115, the blade 15 cuts into the work surface 105 and travels along cut 112. Once the cut 112 is completed, the machine 10 moves along the carry section 116 and the blade 15 may generally follow the carry surface 114 without significantly cutting into material 104. The machine 10 may move along the carry section 116 until the machine reaches a boundary 109 that is a predetermined distance from the crest 106. The crest section 117 may extend a predetermined width or distance from the crest 106 into the work site 100. The crest section 117 may be used as a buffer or zone in which additional measures or processes may be used to reduce the likelihood that machines 10 will move closer to crest 106 than desired. The width of the crest section 117 may be fixed for a particular work site 100, a particular work area of the work site, or may even change along the crest 106. Factors that influence the width of the crest section 117 may include the height and angle of the slope adjacent the crest 106, environmental conditions in which the machine 10 is being operated as well as the type of material at the work site 100. For efficient operation, each material moving pass may begin with the machine 10 being positioned slightly rearward (to the left in FIG. 3) of the cut location 113. However, in some instances, machine 10 may be moved along a transit section 118 from a remote location 119 to the cut location 113.

During a slot dozing operation, machine 10 may initially be moved along transit section 118 generally to the cut location 113. Once generally positioned at the cut location 113, the machine 10 may be moved forward (to the right in FIG. 3) towards dump location 108. As the machine 10 moves along the cut section 115, the blade 15 moves along cut 112 and is loaded with material 104. Upon reaching the carry section 116, the blade 15 may generally stop cutting into the work surface 105 and material 104 from the cut 112 is moved along the carry surface 114 towards the dump location 108. The machine 10 may continue to move the material 104 along the carry surface 114 as the machine enters the crest section 117 to spread or dump the material 104 as desired.

While operating machine 10 in an autonomous or semi-autonomous manner, the machine may communicate with one or more remote systems spaced from the machine 10. As stated above, if the signal transmission with any of the remote systems is interrupted, the controller 36 may stop the machine 10 as a safety precaution. The length of the threshold of the interruption or the signal transmission threshold may be influenced or changed by one or more parameters including the operating conditions of the machine 10 and the location of the machine within the work site 100. In one aspect, the signal transmission threshold may be time based and expressed as a function of time and may vary depending on the operation being performed by the machine (i.e., the mode of operation of the machine). The length of time of an interruption may be more critical while performing some operations as compared to others. For example, while the machine 10 is moving along the cut section 115 depicted in FIG. 3, it may be desirable to closely control the position of the blade 15. In some instances, even an interruption in signal transmission of a short duration may result in the blade 15 varying from the desired path of the cut 112. Accordingly, the controller 36 may be configured to stop the machine 10 while performing a cutting operation if an interruption of signal transmission of a relatively short duration occurs. In one example, the period of the interruption or signal transmission threshold resulting in stoppage of the machine 10 along cut section 115 may be as small as approximately 0.5 seconds.

While the machine 10 is moving along the carry section 116, the exact position of the machine may be less critical than during other operations. Accordingly, the controller 36 may permit an interruption in signal transmission of a substantially greater time before stopping the machine 10. In one example, the period of the interruption or signal transmission threshold along the carry section 116 may be approximately 3.0 seconds. Once the machine 10 enters the crest section 117, the position of the machine and the images from the cameras 41 may become particularly important to prevent the machine 10 from moving too close to the crest 106. Accordingly, the controller 36 may only permit a short interruption in signal transmission before stopping the machine 10. In one example, the period of the interruption or signal transmission threshold along crest section 117 may be as small as approximately 0.5 seconds.

While the machine 10 is reversing from the dump location 108 generally back to the cut location 113, it may be desirable to generally closely monitor the position of the machine 10 to reduce the risk that the machine 10 may drive into or over the walls between slots 110. In such case, the period of the interruption or signal transmission threshold may be as small as approximately 1.0 second. Still further, when moving the machine 10 without cutting or carrying a load of material 104 and when not positioned within crest section 117 such as while moving the machine within the transit section 118, the exact position of the machine 10 may not be particularly critical. Accordingly, the controller 36 may increase the length of time of a signal transmission interruption before stopping the machine 10 and the period of the interruption or signal transmission threshold along transit section 118 may be approximately 3.0 seconds.

In each instance described above, the controller 36 may be configured to permit or control movement of the machine 10 until the period of the interruption or signal transmission threshold for each section or mode of operation of the machine is reached or exceeded. The lengths of the signal transmission thresholds provided above are examples to show potential relative differences that may be used while the machine 10 is in different modes of operation at different sections of the slot 110. Other time periods and the relative differences between time periods are contemplated.

Once the signal transmission threshold is reached, the controller 36 may stop movement of the machine 10. In one example, the controller 36 may be configured to maintain the position of the machine 10 until an operator restarts movement of the machine 10 by providing a command signal to the controller. In another example, the controller 36 may be configured to re-start movement of the machine 10 once the signal transmission begins again and the position of the machine is determined.

In another aspect, since the speed of the machine 10 may vary, the signal transmission threshold may be a function of the distance that the machine 10 has traveled rather than a function of time. As such, the signal transmission threshold may be distance based and expressed as a distance rather than a time. In a manner similar to that described above with respect to signal transmission thresholds expressed above with respect to time, in some instances, the distances of the signal transmission threshold may be a function of the mode of operation of the machine. For example, the distance of permitted movement during an interruption in signal transmission for a machine may be approximately 0.25 meters while operating in the cut section 115, approximately 0.5 meters while operating in the carry section 116, approximately 0.25 meters while operating in the crest section 117, approximately 0.5 meters while the machine 10 is reversing from the dump location 108 generally back to the cut location 113, and approximately 1.0 meter while operating in the transit section 118. In each instance, the controller 36 may be configured to control movement of the machine 10 until the signal transmission threshold for a particular mode of operation of the machine is reached or exceeded. Once the signal transmission threshold is reached, the controller 36 may stop movement of the machine 10.

As described above, the controller 36 may be configured to maintain the position of the machine 10 until an operator restarts movement of the machine 10 by providing a command signal to the controller or the controller may be configured to re-start movement of the machine 10 once the signal transmission begins again and the position of the machine is determined. If desired, the signal transmission threshold may be both a function of time and distance. In one example, a threshold may be met if either the time requirement or the distance requirement has been met.

A plurality of variations from the embodiments described above are contemplated. For example, in some instances, the controller 36 may initially slow the machine 10 rather than stop its movement. If the signal transmission is not reconnected within a predetermined amount of time, the controller 36 may stop movement of the machine 10. Still further, the signal transmission threshold may be set based upon one or more of a plurality of factors such as the type of signal interrupted, the position of the machine 10 at the work site 100, and the operation being performed by the machine (i.e., the mode of operation of the machine). In one example, different thresholds may be used depending on whether the signals being interrupted are signals from the remote positioning system, command signals sent from the remote control console 130 to the machine 10, or visual image signals sent to the remote control console.

Figure 4:
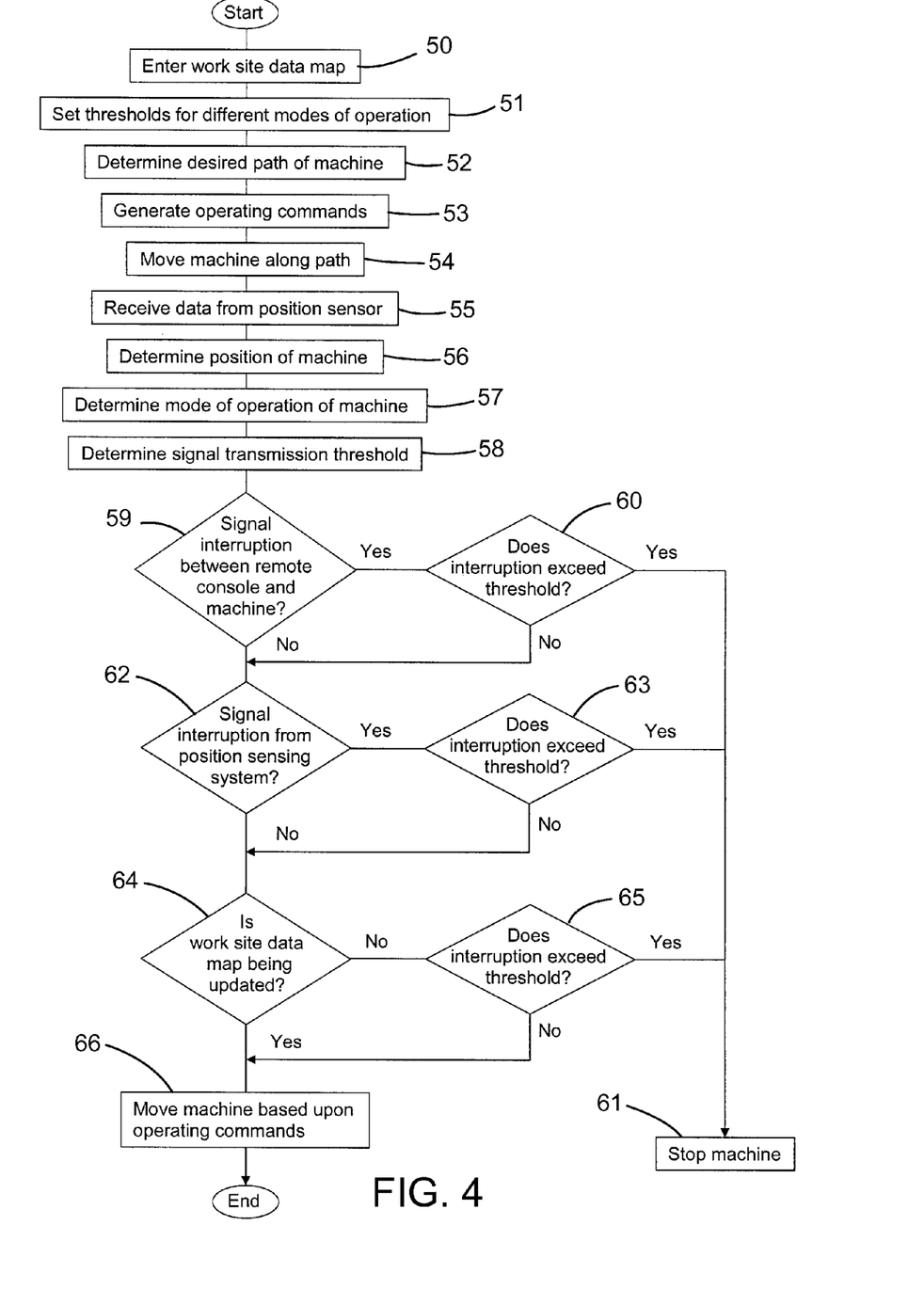
FIG. 4 shows a flowchart illustrating a signal transmission threshold adjustment process in accordance with the disclosure.

FIG. 4 depicts a process for controlling movement of a machine 10 operating in an autonomous or semi-autonomous manner. At stage 50, an electronic map of the work site 100 may be entered or stored within controller 36. In some embodiments, the electronic map may include the location of a plurality of obstacles with each obstacle having a keep-out or avoidance zone associated therewith. At stage 51, signal transmission thresholds may be set within controller 36 for different operations or different modes of operation of machine 10. More specifically, different signal transmission thresholds may be set based upon the operation being performed by the machine 10. In the example in which machine 10 is a dozer 13, a first signal transmission threshold may be used while the machine is performing a cut operation along cut section 115. A second signal transmission threshold may be used while the machine is performing a carry operation such as along carry section 116. Still further, a third signal transmission threshold may be used while the machine 10 is spreading material. A fourth signal transmission threshold may be used while the machine 10 is backing up from dump location 108 towards a new cut location 113. A fifth signal transmission threshold may be used while the machine 10 is moving from a remote location to the cut location 113 such as along transit section 118.

In addition, if desired, different or additional signal transmission thresholds may be set based upon the location of the machine 10 within the work site 100. For example, a sixth signal transmission threshold may be used while the machine 10 is operating within the crest section 117 that extends from boundary 109 to the crest 106. The signal transmission thresholds may be set based upon the mode of operation of the machine 10, the position of the machine 10 at the work site 100, and other factors that affect the operation of the machine including potential hazards or obstacles or any combination of the foregoing. In addition, in some instances, the signal transmission thresholds may also be based at least in part upon the position of the work implement or blade 15.

At stage 52, the controller 36 may determine a desired path of machine 10. For example, the controller 36 may determine the path of machine 10 along slot 110 and identify a different operation to be performed at different sections along the path. At stage 53, the controller 36 may generate operating commands to control the operation of the machine 10. Based upon these operating commands, the machine 10 may move along the desired path at stage 54. As the machine 10 moves along the path, the controller 36 may receive at stage 55 data from the position sensor 33. The controller 36 may use the data from the position sensor 33 to determine the position of machine 10 at stage 56. In some instances, the data from the position sensor 33 may be used at least in part to determine the position of the work implement or blade 15.

The controller 36 may determine at stage 57 the mode of operation of the machine 10 based at least in part upon the position of the machine 10. At stage 58, the signal transmission threshold may be determined. In some instances, the signal transmission threshold may be determined based at least in part upon the mode of operation of the machine. In another example, the signal transmission threshold may be based at least in part upon the position of the machine 10 within the work site 100.

When operating in an autonomous or semi-autonomous mode, the machine 10 may receive signals from a plurality of different remote systems. In one example, the remote system may be a remote control system for operating the machine remotely. The remote control system may provide operating signals to the machine 10 and an interruption in signal transmission may be an interruption in operating signals provided to the machine 10. In another example, the machine 10 may include one or more visual image sensors for generating visual images indicative of a point of view relative to the machine. The remote control system may include a point of view display 132 at remote control console 130. An interruption in signal transmission may result in an interruption in the visual image signals provided to the remote control system.

In another example, the remote system may be a position sensing system 32 for determining the position of the machine relative to the work site 100. An interruption in signal transmission may be an interruption in signals from the position sensing system 32. In another example, the remote system may be a mapping system that provides mapping signals indicative of a representation of the work site 100. In such case, an interruption in signal transmission may be an interruption in the mapping signals, either provided to the mapping system, to the machine 10, or to some other system.

At decision stage 59, the controller 36 may determine whether an interruption in signal transmission through a communications channel or link has occurred between the machine 10 and the remote control console 130. If an interruption in signal transmission has occurred, the controller 36 determines at decision stage 60 whether the interruption in signal transmission exceeds the signal transmission threshold. If the interruption exceeds the signal transmission threshold, the controller 36 may stop the machine 10 at stage 61 and await further instructions.

If the interruption in signal transmission does not exceed the signal transmission threshold at decision stage 60, the controller 36 may determine at decision stage 62 whether there is an interruption in signal transmission along a communications channel or link from the position sensing system 32. In one embodiment, the position sensing system 32 may include a global positioning system and the interruption in signal transmission may be an interruption in signals from the global positioning system. If an interruption in signal transmission from the position sensing system 32 exists, the controller 36 determines at decision stage 63 whether the interruption exceeds the signal transmission threshold. If the interruption exceeds the signal transmission threshold, the controller 36 may stop machine 10 at stage 61 and await further instructions.

If the interruption does not exceed the signal transmission threshold, the controller 36 may determine at decision stage 64 whether an interruption in signal transmission is occurring that is resulting in an interruption in mapping signals being provided to the mapping system. If an interruption in signal transmission is occurring, the controller 36 may determine at decision stage 65 whether the interruption exceeds the signal transmission threshold. If the interruption does exceed the signal transmission threshold, the controller 36 may stop machine 10 at stage 61 and await further instructions. If the interruption does not exceed the signal transmission threshold, the controller 36 may move the machine at stage 66 based upon the operating commands.

In still another aspect, the controller 36 may be configured to stop the machine if the machine encounters an obstacle in its path. The controller 36 may define a zone of interference 70 (FIG. 5) around the machine 10 and such zone of interference may increase in size upon an interruption in signal transmission. More specifically, the zone of interference 70 may be defined about, surrounding or extending from the machine 10 and the zone of interference may dynamically increase upon an interruption in signal transmission.

In one embodiment, the control system 35 may include a virtual or electronic map of the work site 100. The map may include, for example, data defining the elevation of the work surface 105, a plurality of paths or roads 102 along the work site 100, and various obstacles to be avoided. The obstacles at the work site 100 may include natural obstacles such as a crest, a body of water, a tree, or a high grade as well as road conditions such as potholes, loose gravel, or a dynamic weather related condition such as ice or mud. The obstacles at work site 100 may further include hazardous areas such as a fuel site, a waste site, or a blasting operation, and stationary objects such as a fire hydrant, a parking lot, a gas or electric line, or a tank as well as facilities such as a storage facilities and trailers. Still further, the obstacles may include movable objects such as machines, vehicles, and personnel. Each of the obstacles may have an avoidance zone or keep-out area associated therewith. The position of each obstacle and its avoidance zone may be stored in the controller 36 as part of the electronic map. The electronic map may be updated as desired.

Figure 5:
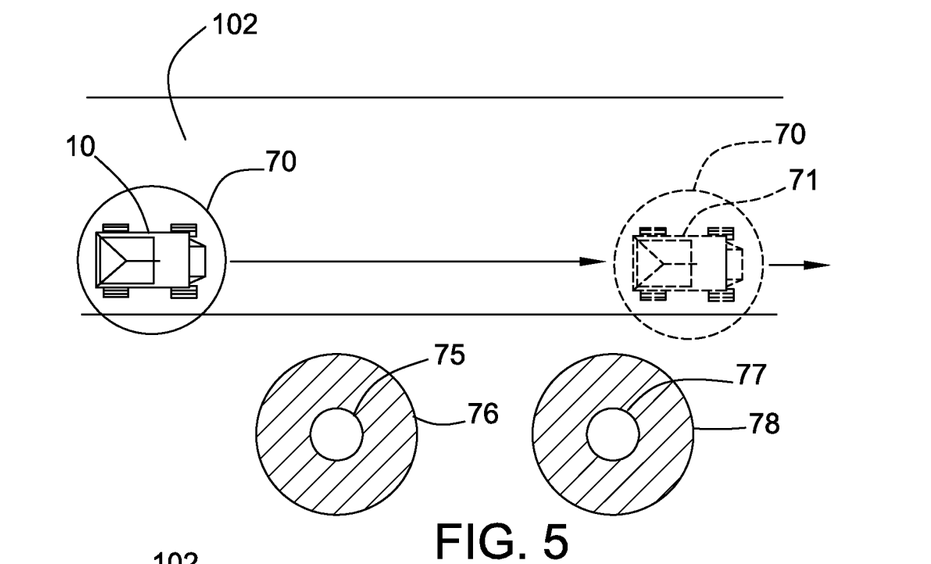
FIG. 5 shows a schematic view of a machine passing a pair of obstacles.

A machine 10 such as a load truck 12 may be configured to move within the work site 100 from a first location such as open pit mine 101 to a second location such as dump location 108 via one or more roads 102 or other designated paths. In doing so, as depicted in FIG. 4, the machine 10 may encounter a plurality of obstacles such as first obstacle 75 and second obstacle 77 adjacent the road 102. A first avoidance zone 76 may surround or extend from the first obstacle 75 and a second avoidance zone 78 may surround or extend from the second obstacle 77. As depicted in FIG. 5 in which the signal transmission has not been interrupted, the zone of interference 70 surrounding or about the machine 10 may remain a constant size or extent as the machine moves along road 102. As the machine 10 moves past the first obstacle 75 and the second obstacle 77, there is no overlap of the zone of interference 70 with the first avoidance zone 76 or the second avoidance zone 78. As a result, machine 10 is able, as depicted in dashed lines at 10, to pass the first obstacle 75 and the second obstacle 77 and move towards its ultimate destination.

Upon the occurrence of an interruption in signal transmission, the controller 36 may be configured to increase the size of the zone of interference 70 surrounding the machine 10. The increase may be based upon the length of the interruption in signal transmission and the increase in size of the zone may be accomplished in any manner including linear and non-linear functions. In a first example similar to that described above, the zone of interference 70 may increase in size based upon the length of time of the signal interruption. In another example similar to that described above, the zone of interference 70 may increase in size based upon the distance moved by machine 10. In still another example, the zone of interference 70 may increase in size based upon the velocity of the machine 10.

Figure 6:
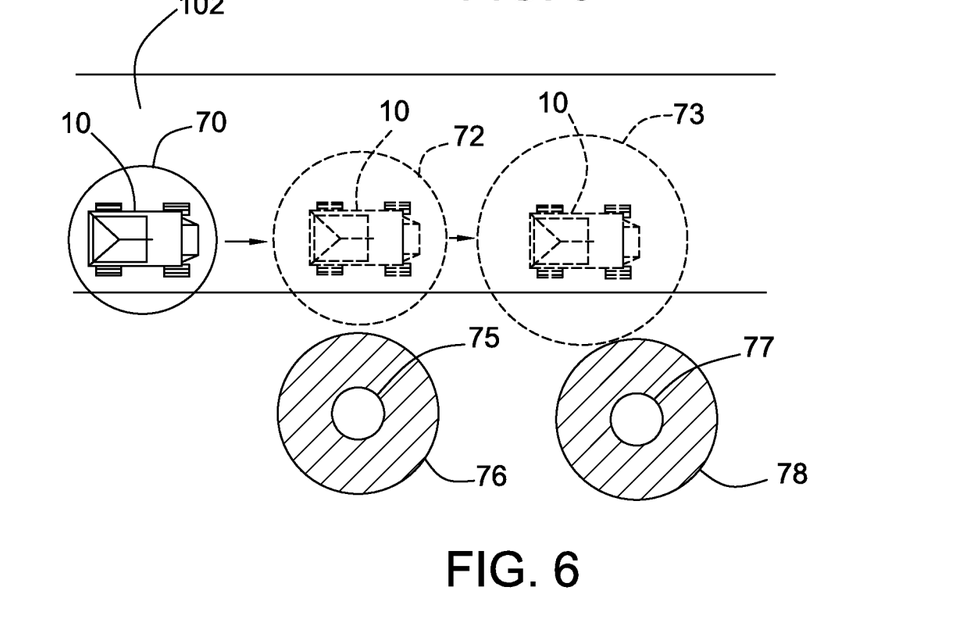
FIG. 6 is a view similar to that of FIG. 5 but with the machine stopping before it passes the second obstacle.

FIG. 6 depicts the machine 10 as it moves past the first obstacle 75 and the second obstacle 77 after an interruption in signal transmission. In doing so, the zone of interference 70 increases in size and a first expanded zone of interference is depicted in dashed lines at 72. Inasmuch as the first expanded zone of interference 72 does not overlap or intersect with the first avoidance zone 76 surrounding the first obstacle 75, machine 10 may pass by the first obstacle. However, as the interruption in signal transmission continues, the zone of interference 70 may continue to increase in size so as to define a second expanded zone of interference depicted in dashed lines at 73. As the machine 10 attempts to pass the second obstacle 77, the second expanded zone of interference 73 intersects at 79 with the second avoidance zone 78 surrounding second obstacle 77 and the controller 36 may generate a command signal to stop the machine 10.

The rate of the increase in size of the zone of interference 70 may be based upon the position of the machine 10 within the work site 100, the operation being performed by machine, or the type of signal that is interrupted. For example, in areas in which there is a greater risk of encountering obstacles (e.g., loading and unloading zones) or the obstacles are particularly hazardous, the zone of interference 70 may increase at a relatively high rate. In areas such as roads 102 between the loading and unloading zones, the zone of interference 70 may increase at a slower rate.

A plurality of variations from the embodiments described above are contemplated. For example, in some instances, the controller 36 may initially slow the machine 10 rather than stop its movement upon an intersection between the zone of interference 70 and an avoidance zone surrounding an obstacle. Continued movement of the machine 10 without a reconnection of the signal transmission or communications link may result in the controller 36 stopping the machine 10. The rate of increase of the zone of interference 70 may be based upon one or more of a plurality of factors such as the type of signal interrupted, the position of the machine 10 at the work site 100, and the operation being performed by the machine (i.e., the mode of operation of the machine). Examples of the types of signals being interrupted may include signals from the remote positioning system, command signals sent from the remote control console 130 to the machine 10, or visual image signals sent to the remote control console. Still further, rather than increase the size of the zone of interference 70 around the machine 10, in some instances, the size of the avoidance zone around each obstacle may be increased upon an interruption in signal transmission. In other words, the controller 36 may increase the size of one or both of the zone of interference 70 and the avoidance zone.

Although depicted as extending in a generally circular manner about machine 10, the zone of interference 70 may not extend completely around the machine 10. The zone of interference may have another shape sufficient to detect the intersection with the avoidance zone of adjacent obstacles. As examples, the zone of interference 70 may embody an arc or a straight line extending generally towards each obstacle. As the machine moves, the non-circular zone of interference may be dynamic and may change as the machine moves relative to each obstacle. Similarly, the avoidance zone associated with each obstacle may also be non-linear with a shape sufficient to permit the detection of the obstacle. As examples, the avoidance zones may also embody arcs or straight lines that extend generally towards machine 10 and may dynamically change as the machine 10 moves relative to each obstacle.

Industrial Applicability

The industrial applicability of the system described herein will be readily appreciated from the forgoing discussion. The foregoing discussion is applicable to machines 10 that are autonomously or semi-autonomously operated to move in a desired manner. Such system may be used at a mining site, a landfill, a quarry, a construction site, a roadwork site, a forest, a farm, or any other area in which movement of a machine is desired.

As machine 10 moves, the controller 36 may receive signals or data from various systems and sensors positioned remote from the machine. In one aspect, upon an interruption in signal transmission, the controller 36 may be configured to stop or reduce the speed of the machine 10. The extent of the signal interruption may be measured in one or more manners including the length of time of the interruption and/or the distance the machine 10 has moved during the interruption. The controller 36 may be configured to utilize different signal transmission thresholds based upon the mode of operation of the machine, the position of the machine 10 within work site 100, the type of signal being interrupted, and other factors associated with machine 10 or the control system 35. As a result, the controller 36 may be configured to stop or reduce the speed of the machine 10 based upon perceived risks and other factors associated with the specific operation or position of the machine. By utilizing different signal transmission thresholds, the efficiency of the operation of the machine 10 may be increased.

In another aspect, an electronic map may be stored by the controller 36 including an avoidance zone around each obstacle and a zone of interference 70 around machine 10. Upon an interruption in signal transmission, the zone of interference 70 may increase in size. The controller 36 may be configured to stop machine 10 if the zone of interference 70 intersects or conflicts with an avoidance zone of an obstacle. The zone of interference 70 may be a function of one or more factors including the length of time of the interruption and/or the distance the machine 10 has moved during the interruption. The rate at which the zone of interference may increase in size may be a function of the mode of operation of the machine 10, the position of the machine within work site 100, type of signal being interrupted, or other factors associated with machine 10 or the control system 35.

It will be appreciated that the foregoing description provides examples of the disclosed system and technique. All references to the disclosure or examples thereof are intended to reference the particular example being discussed at that point and are not intended to imply any limitation as to the scope of the disclosure more generally. For example, although described in the context of slot dozing, the foregoing description is applicable to a wide variety of environments, operations, and applications. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling movement of a machine, comprising:
    a drive system for causing movement of the machine;
    a position sensor associated with the machine for generating position signals indicative of a position of the machine;
    a communications system for transmitting signals between the machine and a remote system spaced from the machine; and
    a controller configured to:
        store an electronic map of a work site, the electronic map including a plurality of signal transmission thresholds corresponding to positions on the electronic map;
        determine the position of the machine at the work site based upon the position signals;
        receive the signals from the remote system;
        determine a selected signal transmission threshold from the plurality of signal transmission thresholds based at least in part upon the position of the machine; and
        generate a command signal to stop movement of the machine upon an interruption in signal transmission from the remote system exceeding the selected signal transmission threshold.

2. The system of claim 1, wherein at least one of the signal transmission thresholds is at least in part time based.

3. The system of claim 1, wherein at least one of the signal transmission thresholds is at least in part distance based.

4. The system of claim 1, wherein at least one of the signal transmission thresholds is at least in part velocity based.

5. The system of claim 1, wherein the controller is further configured to determine a mode of operation of the machine based at least in part upon the position of the machine and determine the selected signal transmission threshold based at least in part upon the mode of operation.

6. The system of claim 1, wherein the controller further determines a position of a work implement and the selected signal transmission threshold is determined based at least in part upon the position of the work implement.

7. The system of claim 1, wherein the remote system is a position sensing system for determining the position of the machine relative to a work site and the interruption in signal transmission is an interruption in signals from the position sensing system.

8. The system of claim 7, wherein the position sensing system includes a global positioning system and a movement sensor, the movement sensor being positioned on the machine for generating movement signals indicative of movement of the machine, and the controller is further configured to determine a position of the machine based in part on the movement signals.

9. The system of claim 1, wherein the remote system is a remote control system for operating the machine remotely.

10. The system of claim 9, wherein the remote control system provides operating signals to the machine and the interruption in signal transmission is an interruption in the operating signals provided to the machine.

11. The system of claim 9, wherein the machine includes a visual image sensor for generating visual image signals indicative of a point of view relative to the machine, and the controller is further configured to transmit visual image signals indicative of the point of view relative to the machine to the remote control system and display point of view images on a point of view display based upon the visual image signals, and the interruption in signal transmission is an interruption in the visual image signals provided to the remote control system.

12. The system of claim 1, wherein the remote system is mapping system providing mapping signals indicative of a representation of a work site, and the interruption in signal transmission is an interruption in the mapping signals.

13. A controller-implemented method for controlling movement of a machine, comprising:
    storing an electronic map of a work site, the electronic map including a plurality of signal transmission thresholds corresponding to positions on the electronic map;
    determining a position of the machine at the work site based upon position signals from a position sensor associated with the machine;
    moving the machine;
    receiving signals from a remote system spaced from the machine;
    determining a selected signal transmission threshold from the plurality of signal transmission thresholds based at least in part upon the position of the machine; and
    generating a command signal to stop movement of the machine upon an interruption in signal transmission from the remote system exceeding the selected signal transmission threshold.

14. A system for controlling movement of a machine within a work site, comprising:
    a drive system for causing movement of the machine;
    a position sensor associated with the machine for generating position signals indicative of a position of the machine;
    a communications system for transmitting signals between the machine and a remote system spaced from the machine; and
    a controller configured to:
        store an electronic map of the work site, the electronic map including a plurality of obstacles, each obstacle having an avoidance zone associated therewith;
        determine the position of the machine based upon the position signals;
        receive the signals from the remote system;
        determine a zone of interference associated with the machine;
        estimate a new position of the machine upon an interruption in signal transmission from the remote system to the machine;
        increase a size of one of the zone of interference and the avoidance zone upon the interruption in signal transmission from the remote system to the machine; and
        generate a command signal to stop movement of the machine if the zone of interference intersects with the avoidance zone.

15. The system of claim 14, wherein the controller increases the size of the zone of interference.

16. The system of claim 14, wherein the increase in size of the zone of interference is time based.

17. The system of claim 14, wherein the increase in size of the zone of interference is distance based.

18. The system of claim 14, wherein the controller is further configured to determine a mode of operation of the machine based at least in part upon the position of the machine and determine the increase in size of the zone of interference based at least in part upon the mode of operation.

19. The system of claim 14, wherein the remote system is a position sensing system for determining the position of the machine relative to a work site and the interruption in signal transmission is an interruption in signals from the position sensing system to the machine.

20. The system of claim 14, wherein the remote system is a remote control system for operating the machine remotely and the remote control system provides operating signals to the machine, the machine further includes a visual image sensor for generating visual image signals indicative of a point of view relative to the machine, the controller is further configured to transmit visual image signals indicative of the point of view relative to the machine to the remote control system and display point of view images on a point of view display based upon the visual image signals, and the interruption in signal transmission is one of an interruption in the operating signals provided to the machine and an interruption in the visual image signals provided to the remote control system.

* * * * *